United States Patent [19]
Fujii

[11] Patent Number: 5,063,810
[45] Date of Patent: Nov. 12, 1991

[54] SHIFT MECHANISM

[75] Inventor: Isao Fujii, Shizuoka, Japan

[73] Assignee: Suzuki Jisoshi Kogyo Kabushiki Kaisha, Shizuoka, Japan

[21] Appl. No.: 540,321

[22] Filed: Jun. 19, 1990

[30] Foreign Application Priority Data

Jun. 29, 1989 [JP] Japan .................................. 1-167674

[51] Int. Cl.⁵ .............................................. B60K 23/00
[52] U.S. Cl. ................................................. 74/473 R
[58] Field of Search ...................................... 74/473 R

[56] References Cited

U.S. PATENT DOCUMENTS

| | | | |
|---|---|---|---|
| 1,970,690 | 8/1934 | Churchill | 74/473 R |
| 2,083,715 | 6/1937 | Kesling | 74/473 R |
| 2,250,820 | 7/1941 | Backus | 74/473 R |
| 2,312,975 | 3/1943 | Peterson et al. | 74/473 R |
| 3,768,328 | 10/1973 | Campbell | 74/473 R X |
| 4,143,560 | 3/1979 | Kinkade et al. | 74/473 R |
| 4,583,417 | 4/1986 | Hurlow | 74/473 R |
| 4,916,964 | 4/1990 | Crack | 74/473 R X |

FOREIGN PATENT DOCUMENTS

| | | | |
|---|---|---|---|
| 84751 | 8/1983 | European Pat. Off. | 74/473 R |
| 273874 | 7/1988 | European Pat. Off. | 74/473 R |
| 56-35854 | 8/1981 | Japan . | |
| 60-179339 | 9/1985 | Japan | 74/473 R |
| 62-27926 | 7/1987 | Japan . | |
| 64-7386 | 2/1989 | Japan . | |

Primary Examiner—Leslie A. Braun
Assistant Examiner—Scott Anchell
Attorney, Agent, or Firm—Flynn, Thiel, Boutell & Tanis

[57] ABSTRACT

A shift mechanism for a speed change gear mounted in a horizontal posture on a horizontal engine which is mounted on a rear side of a four wheel drive vehicle. The shift mechanism includes a shift cable and a select cable which are generally linearly wired from the front to the rear of the vehicle. The shift mechanism also includes a first engaging portion and a first link mechanism for converting rotational motion of a shift lever, as transmitted to the shift lever through said shift cable, to a reciprocating motion of a shift and select shaft. The shift mechanism further includes a second engaging portion and second link mechanism for converting rotational motion of a select lever, as transmitted to the select lever through said select cable, to a reciprocating motion of said shift and select shaft.

5 Claims, 5 Drawing Sheets

SHIFT MECHANISM

FIELD OF THE INVENTION

This invention relates to a shift mechanism and particularly to a shift mechanism for transmitting a shifting or selecting action from a speed change operating lever to a speed change gear through a shift lever or a select lever when a shift or select operation of a four wheel drive vehicle is performed.

BACKGROUND OF THE INVENTION

For remote control of a speed change gear used in a vehicle, there is known a shift and select system, a torsion shaft system, and a cam system.

In a shift mechanism of the shift and select system, a shift fork shaft connected with a shift fork is provided on end portions thereof with a shift shaft for performing only shifting and a select shaft for performing only selecting. These two shafts are arranged in perpendicular relation with each other, and the shift lever and select lever are connected to the outer sides of the speed change gear so that speed change is realized by the respective levers.

As for the shift mechanism, one thereof is disclosed in Japanese Utility Model Publication No. Sho 56-35854. A transmission control apparatus for an automotive vehicle as disclosed in this publication is designed such that a control rod of a control lever is communicated with a select outer lever and shift idle lever each through a rod, and it can be easily changed from a remote control system to a floor shift method, thereby simplifying the manufacture of the transmission control apparatus and simplifying the factory facilities and production management.

In Japanese Utility Model Publication No. Sho 62-27926 there is disclosed a supporting structure of an outer cable of a remote control system speed change gear operating mechanism using a push cable, which supporting structure supports the end portion on the speed change gear side of the outer cable through a comparatively soft elastic body capable of absorbing vibrations. The end portion on the side of the speed change gear operating lever of the outer cable is either rigidly supported or supported through a comparatively hard elastic body. Vibration of a power plant system is mostly absorbed by the comparatively soft elastic body, thereby to reduce the generation of noises in the vehicle interior.

Furthermore, considering Japanese Utility Model Publication No. Sho 64-7386, a shift mechanism disclosed in this publication is designed such that a control lever includes a lever body and a select arm member has a ball portion on a tip thereof, and a retainer is rotatably provided with a shaft integrally having a first lever connected to a select operating lever and extending in the horizontal direction, the shaft being integrally connected thereon with a second lever which is to be brought into a connection with the ball portion formed on the tip of the select arm member, thereby forming two kinds of shift mechanisms which can be applied to a transmission having different select directions.

A conventional remote control system shift mechanism 110, as shown in FIGS. 9 through 11, includes a shift and select shaft 112 inserted at right angles with respect to a transmission case 108 of a manual speed change gear 106 for use in a vehicle. One end of this shift and select shaft 112 is slidingly movably provided with a link mounting portion 150 having on its upper portion a shift lever 114 and a select lever 120. The reference numeral 146 is a clutch cable.

The shift lever 114 is connected with one end of a shift cable 142 and the select lever 120 is connected with one end of a select cable 144. The other ends of the respective cables 142 and 144 are connected with a speed change operating lever (not shown), thereby to perform the shift and/or select operation of the manual speed change gear 106 by this speed change operating lever.

However, in the above-mentioned shift mechanism, as shown in FIG. 9, the angles $\alpha$ and $\beta$ of the shift and select cables 142 and 144 with respect to vertical planes oriented transversely of the vehicle are small. Thus, when the other ends of the respective cables 142 and 144 are wired at the front side of the vehicle, the curved states of the respective cables 142 and 144 become large. That is, the cables 142 and 144 must bend substantially. As a consequence, there is significant resistance generated due to the large curve or bending of the respective cables 142 and 144 at the shift or select operations, and the speed change operating feeling is jeopardized.

Also, because the curved states (bends) of the shift and select cables become large, positioning the respective cables becomes difficult and thus practically disadvantageous.

In order to eliminate the above-mentioned inconveniences, the present invention provides a shift mechanism capable of making the bends of a shift cable for connection to a shift lever and a select cable for connection to a select lever small. This permits generally linearly wiring of the respective cables in order to reduce resistance at the shift or select operation and improve the speed change operating feeling, and permits positioning of the respective cables with ease.

The present invention is preferably constructed such that in a shift mechanism for a speed change gear mounted in a horizontal posture on a horizontal engine which is mounted on a rear side of a four wheel drive vehicle, said shift mechanism includes a shift cable and a select cable which are generally linearly wired from the front to the rear of the vehicle. The shift mechanism also includes a first engaging portion and a first link mechanism for converting rotational motion of a shift lever, as transmitted to the shift lever through said shift cable, to a reciprocating motion of a shift and select shaft. The shift mechanism further includes a second engaging portion and second link mechanism for converting rotational motion of a select lever, as transmitted to the select lever through said select cable, to a reciprocating motion of said shift and select shaft.

Due to the present invention, constructed as mentioned above, when the shift cable of the shift mechanism is connected to the shift lever and the select cable is connected to the select lever, that is, when the wiring work or cabling is performed, the curves or bends of the shift cable and the select cable are made small in order to define generally linear cabling and reduce the resistance during the shift or select operation, thereby improving the speed change operating feeling and making the operation of the respective cables easy.

BRIEF DESCRIPTION OF THE DRAWINGS

The embodiment of the present invention will be described hereunder with reference to the drawings, in which.

DETAILED DESCRIPTION

Figure 4:
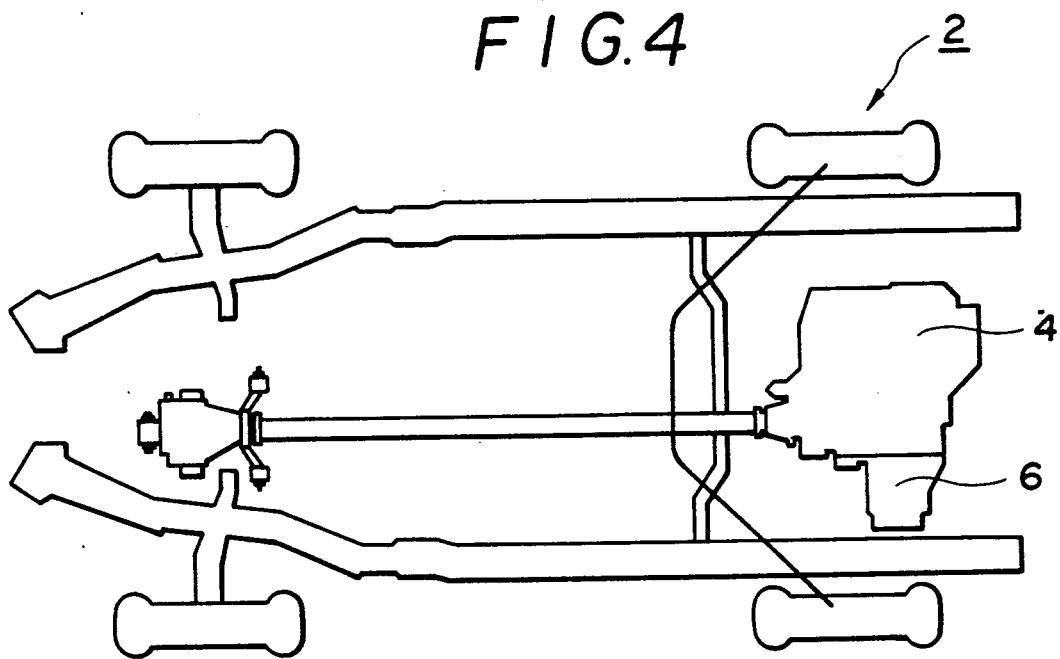
FIG. 4 is a schematic plan view of a four wheel drive vehicle.

In FIG. 4, numeral 2 denotes a four wheel dr vehicle, 4 a horizontal engine mounted on the rear of the vehicle 2, and 6 a manual speed change gear mounted on the engine 4 in a horizontal posture.

The manual speed change gear 6 includes an input shaft (not shown) for inputting a driving force from the internal combustion engine 4, and a counter shaft (not shown) for transmitting a force of rotation of the input shaft to the differential equipment (not shown) for driving the wheels.

Figure 5:
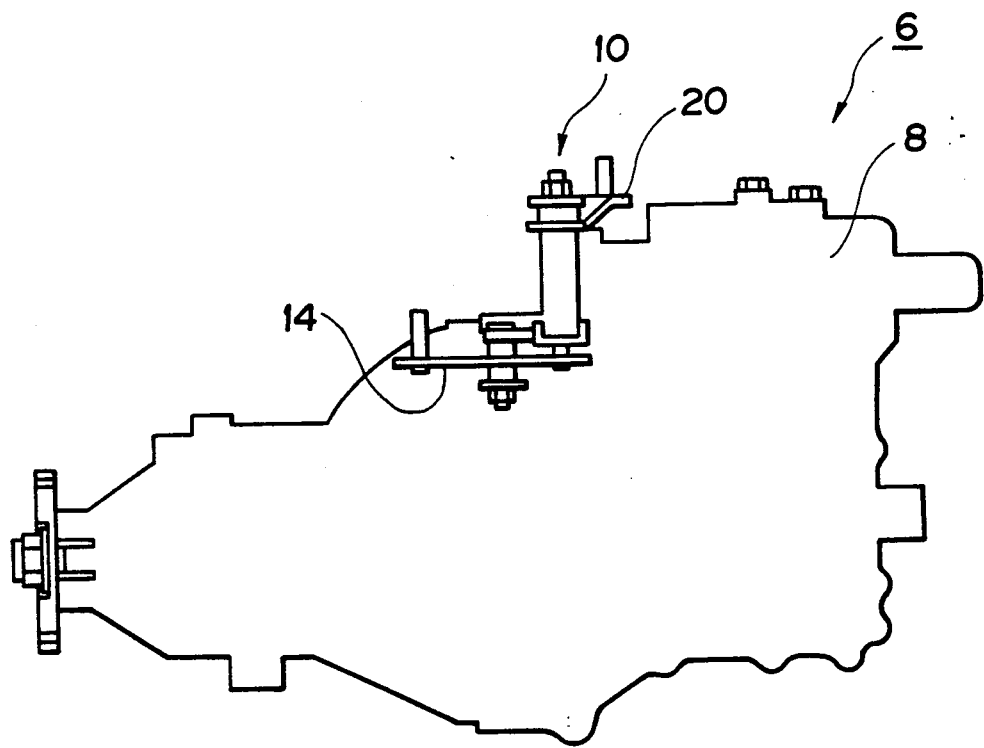
FIG. 5 is a schematic side elevational view of a manual speed change gear showing the shift mechanism of the present invention.
Figure 6:
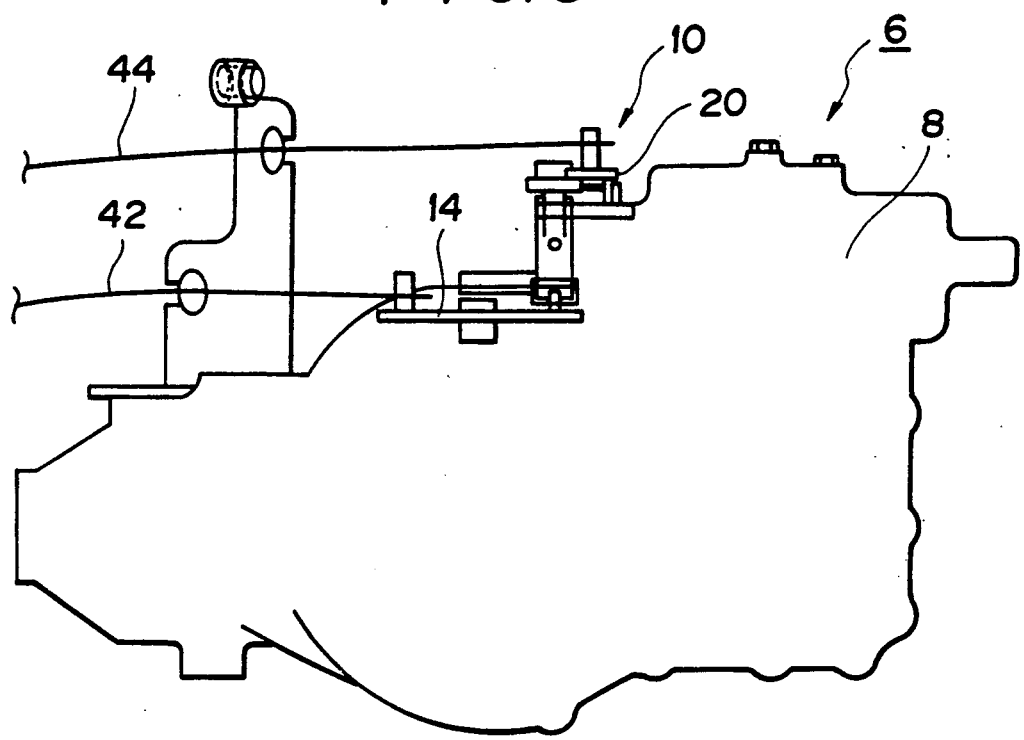
FIG. 6 is a schematic side elevational view of the manual speed change gear showing the wiring states of a shift cable and a select cable.
Figure 7:
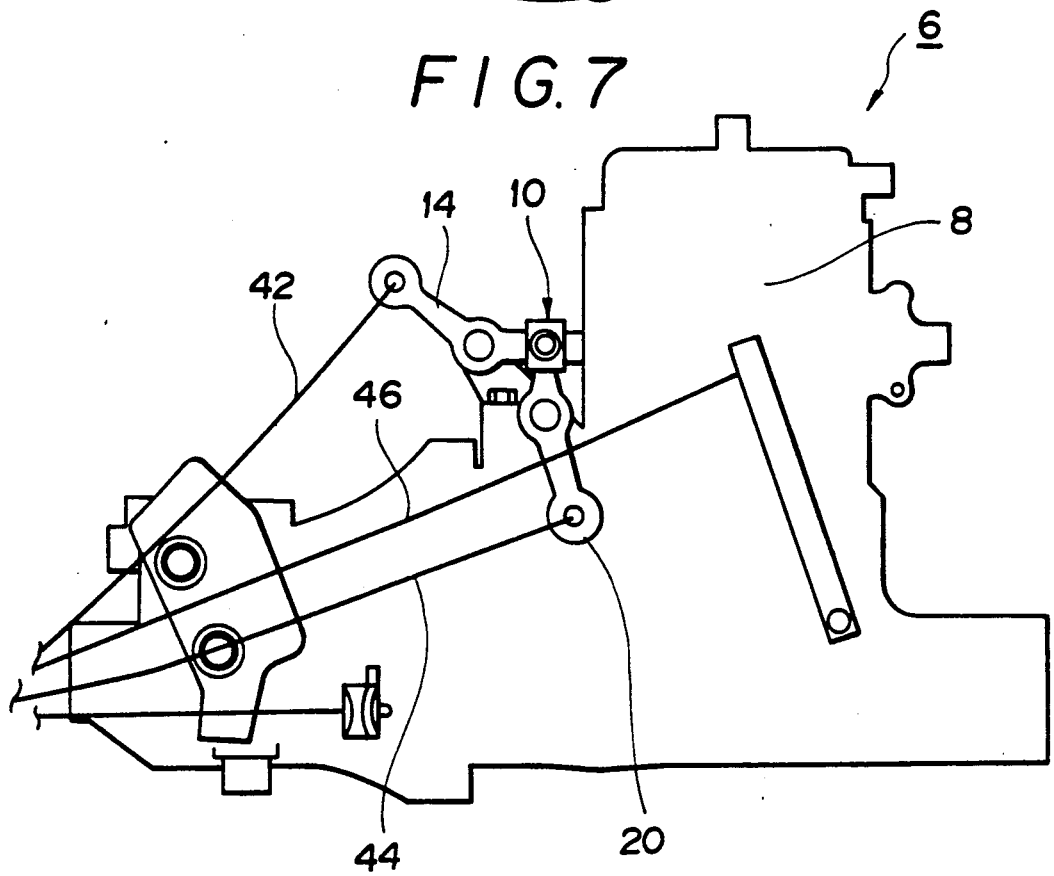
FIG. 7 is a schematic plan view of the manual speed change gear showing the wiring states of the shift cable and the select cable.

Also, on a diagonally upper surface portion of a transmission case 8 of the manual speed change gear 6, for example, on an upper portion of the front side in FIGS. 5 through 7, a shift mechanism 10 is mounted.

Figure 1:
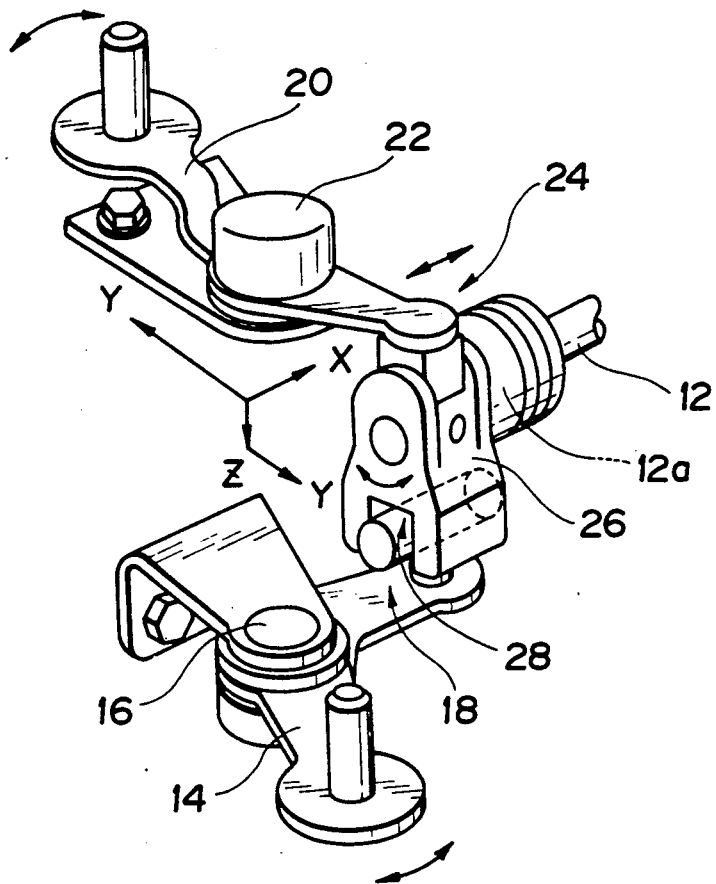
FIG. 1 is a schematic perspective view of a shift mechanism embodying the present invention.

Referring to FIG. 1, the shift mechanism 10 includes a shift and select shaft 12, and a shift lever 14 which is centrally pivotably supported at 16 and which has a first engaging portion 18 at the end of one of the arms thereof for converting rotational motion of the shift lever 14 to angular motion of the shift and select shaft 12. The mechanism 10 also includes a select lever 20 which is centrally pivotably supported at 22 and which has a second engaging portion 24 at the end of one arm for converting rotational motion of the select lever 20 to reciprocating motion of the shift and select shaft 12. Each of the levers 14 and 20 is a bell crank which is generally centrally pivotably supported by pivots 16 and 22, respectively, which pivots define vertical pivot axes.

More specifically, as shown in FIG. 1, one end 12a of the shaft 12 is provided with an arm-like engaging body 26 fixed thereto and projecting radially thereof, and a lower arm portion of this engaging body 26 is of a fork-like configuration for engagement with the engaging portion 18 which is pivotally mounted on the end of shift lever 14. An upper fork-like arm portion of the engaging body 26 is engaged with the engaging portion 24 which is pivotally supported adjacent the end of the select lever 20.

Figure 2:
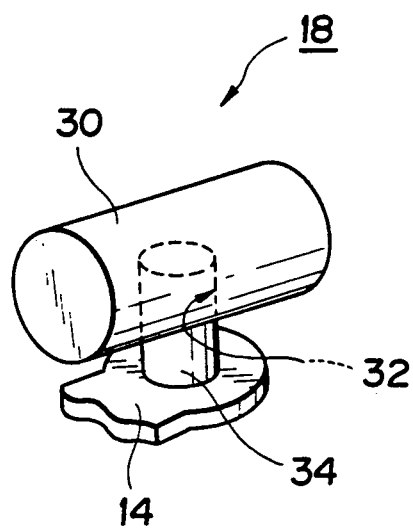
FIG. 2 is an enlarged perspective view of a first engaging portion of the shift mechanism of FIG. 1.

That is, as shown in FIGS. 1 and 2, the lower portion of the engaging body 26 comprises a holding portion 28 having a gate-shaped or forked configuration which in cross section opens radially outwardly in the downward direction and extends in the axial direction of the shift and select shaft 12. Engaging portion 18 includes a cylindrical member 30 slidingly movably held by the holding member 28. Member 30 has a hole 32 defined in a lower portion thereof, and an engaging pin 34 as mounted on an upper surface of one end of the shift lever 14 is loosely inserted in the hole 32.

Figure 3:
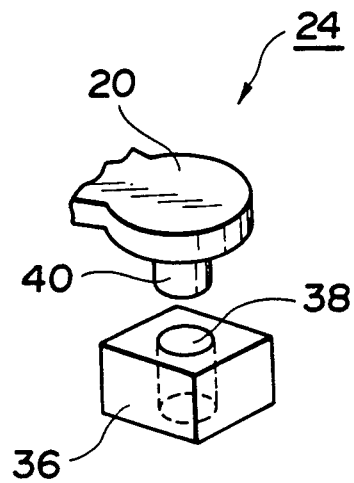
FIG. 3 is an enlarged perspective view of a second engaging portion of the shift mechanism of FIG. 1.

The second engaging portion 24, as shown in FIGS. 1 and 3, includes a blocklike fixing member 36 disposed within the upper forked arm portion of arm 26 and pivotally fixed to the engaging body 26. An engaging hole 38 is defined on an upper surface of the fixing member 36, and a second engaging pin 40 which is mounted on a lower surface of one end of the select lever 20 is loosely inserted into the engaging hole 38.

Furthermore, one end of shift cable 42 is attached to the other end of the shift lever 14, and the other end of the shift cable 42 is connected to a speed change operating lever (not shown) in a conventional manner.

One end of select cable 44 is attached to the other end of the select lever 20, and the other end of the select cable 44 is connected to a speed change operating lever (not shown) in a conventional manner.

Figure 8:
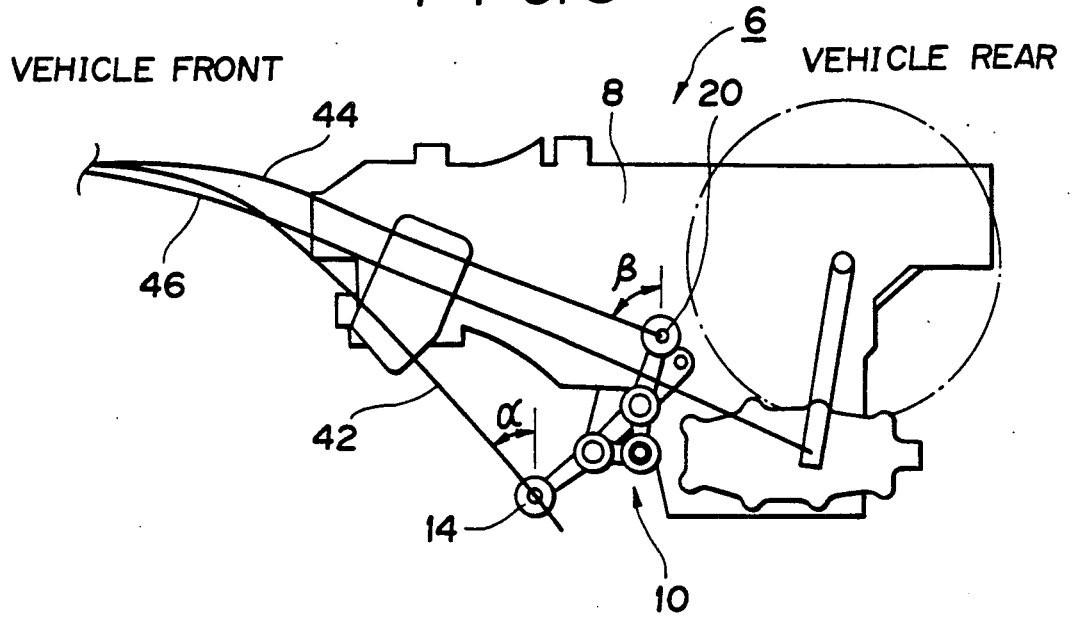
FIG. 8 is a schematic bottom view of the manual speed change gear showing the wiring states of the shift cable and the select cable.
Figure 9:
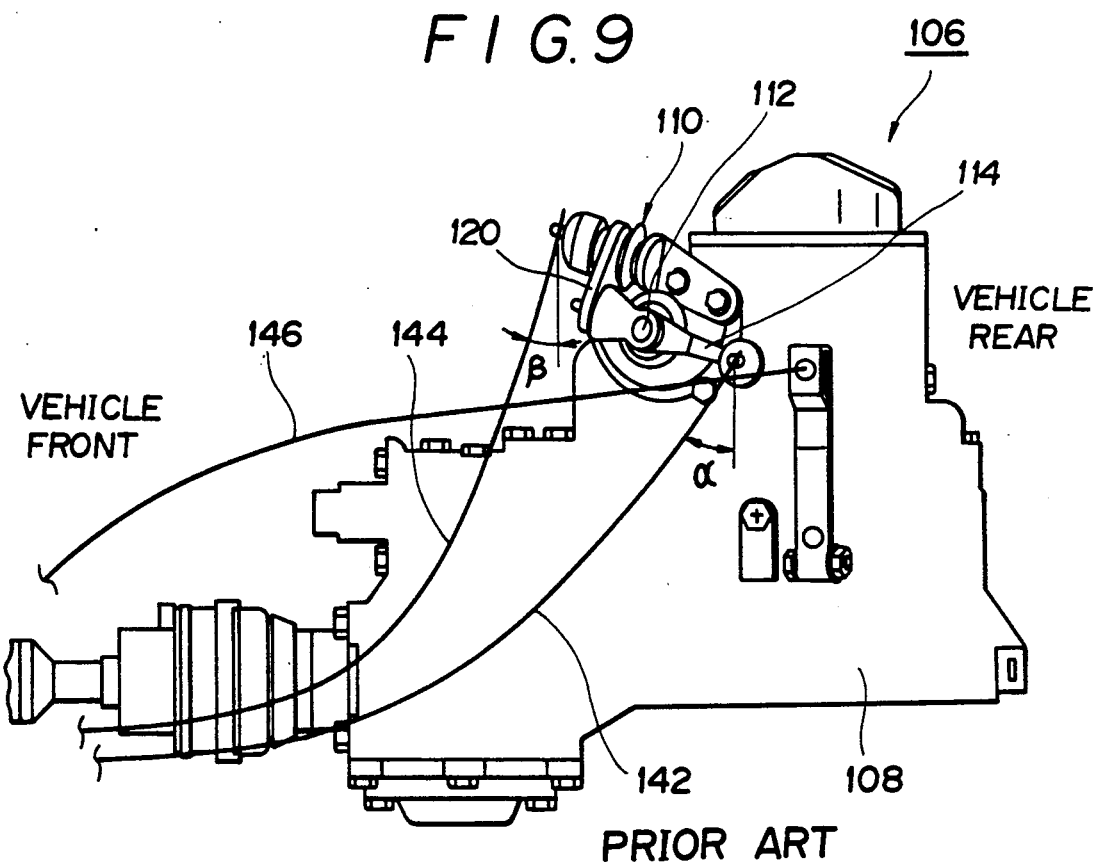
FIG. 9 is a schematic side elevational view of a prior art manual speed change gear showing the wiring states of a shift cable and a select cable.
Figure 10:
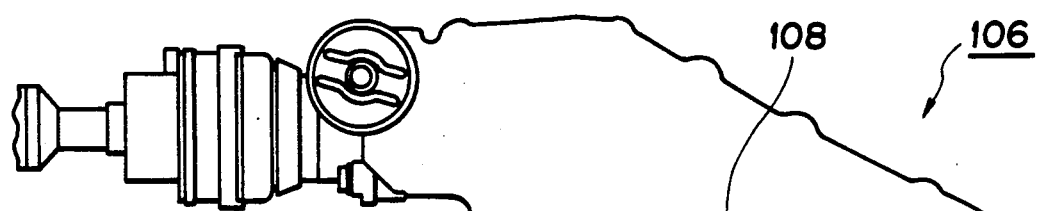
FIG. 10 is a schematic plan view of the prior art manual speed change gear of FIG. 9 showing the wiring states of the shift cable and the select cable.
Figure 11:
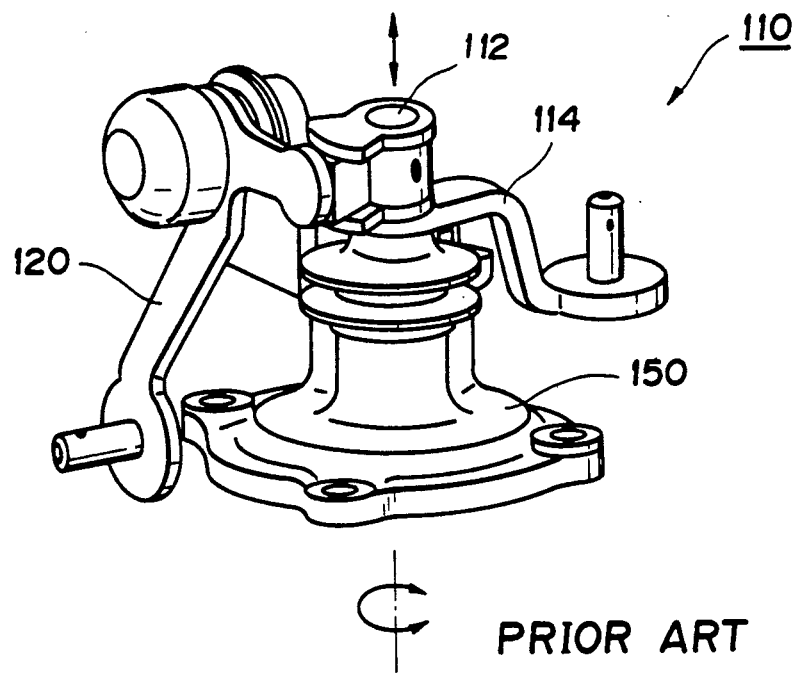
FIG. 11 is a schematic perspective view of a prior art shift mechanism.

In the shift mechanism 10, the angle α (FIG. 8) of the shift cable 42 with respect to a vertical plane oriented transversely of the vehicle 2 and the angle β of the select cable 44 are made large so that the bends of the respective cables are made small even when the other ends of the respective cables 42 and 44 are wired at the front of the vehicle 2. Thus, the shift cable 42 and the select cable 44 are generally linearly wired from the front to the rear of the four wheel drive vehicle 2. That is, the shift and select cables are maintained in a fairly straight condition, being free of sharp bends or turns, to thereby improve the feel of the speed change operation and to ease the operation of the cables. The reference numeral 46 denotes a clutch cable.

Next, the operation will be described.

First, at the time when the shift mechanism 8 is formed, the shift lever 14 is rotatably mounted on the one end 12a of the shift and select shaft 12 through the first engaging portion 18 and the select lever 20 is rotatably mounted thereon through the second engaging portion 24.

The other end (not shown) of the shift and select shaft 12 is inserted in the transmission case 8 of the manual speed change gear 6, and the shift lever 14 and the select lever 20 are mounted on the transmission case 8 in such a manner as to be disposed outside the case (see FIGS. 5 through 8) for pivoting movement generally within horizontal planes.

When the speed change operating lever (not shown) of the manual speed change gear 6 is moved to a desired speed change position, the select lever 20 is rotated through the select cable 44 and the shift lever 14 is rotated through the shift cable 42 so as to move a desired speed fork (not shown) to perform a speed change operation of the manual speed change gear 6.

By this, the angle α of the shift cable 42 and the angle β of the select cable 44 with respect to the respective transverse vertical plane can be made large in the shift mechanism 10. As a result, when the other ends of the respective cables 42 and 44 are connected at the front end of the vehicle 2, only small bends in the respective cables 42 and 44 are necessary. As a consequence, the shift cable 42 and the select cable 44 can be generally linearly wired from front to rear, the resistance generated when the respective cables 42 and 44 are shifted or selected can be reduced, and the feeling of the speed change operation can be improved.

Also, because the bends in the shift cable 42 and the select cable 44 can be made small, the operating movement of the respective cables 42 and 44 becomes easy and thus practically advantageous.

Furthermore, by virtue of the provision of the first and second engaging portions 18 and 24, at the time when the rotational motion of the shift lever 14 is converted to the rotational motion of the shift and select shaft 12 or at the time when the rotational motion of the select lever 20 is converted to the reciprocating motion of the shift and select shaft 12, the sliding action between the holding portion 28 and the cylindrical member 30, the rotational action between the first engaging hole 32 and the first engaging pin 34, and the rotational action between the second engaging hole 38 and the second engaging pin 40 can be performed smoothly.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shift arrangement for a speed change gear mounted in a horizontal posture on a horizontal engine which is mounted adjacent the rear of a four wheel drive vehicle, said shift arrangement comprising an elongate shift cable extending generally between the front and rear of the vehicle, an elongate select cable extending generally between the front and rear of the vehicle, a shift and select shaft associated with the change speed gear and supported for both linear reciprocation and angular oscillation, and a shift mechanism for coupling the shift and select cables to the shift and select shaft, the shift mechanism including a shift lever supported for pivoting movement about a generally vertical axis and being coupled to the rearward end of the shift cable, a select lever supported for pivoting movement about a generally vertical axis and connected to the rearward end of the select cable, a first mechanism coupling said shift lever to said shift and select shaft for transmitting rotational movement of said shift lever to angular displacement of said shaft, a second mechanism coupling said select lever to said shift and select shaft for transmitting rotational motion of the select lever to linear axial motion of the shaft, and said first mechanism including a forked arm secured to and projecting radially of said shaft and being slidably engaged with an intermediate member, said intermediate member being pivotally supported on and carried by said shift lever for pivoting movement on the shift lever about a generally vertical axis which is spaced radially from the vertical pivot axis of the shift lever.

2. An arrangement according to claim 1, wherein the second mechanism includes a second forked arm fixed to and projecting radially of the shift and select shaft, and a second intermediate member which is slidably engaged within the second forked arm and is pivotally supported on said select lever for pivoting about a generally vertical axis which is parallel with but spaced radially from the pivot axis of the select lever.

3. An arrangement according to claim 2, wherein each of said shift and select levers is of a bell crank construction having a central pivot located generally at the intersection between two outwardly projecting arms, the respective intermediate member being pivotally supported on one of the arms adjacent an outer free end thereof, and the respective cable being coupled to the other arm adjacent an outer free end thereof.

4. An arrangement according to claim 5, wherein the cables project forwardly from the respective shift and select levers generally within horizontal planes.

5. An arrangement according to claim 4, wherein said shift and select shaft is disposed with its axis oriented generally within a horizontal plane.

* * * * *

UNITED STATES PATENT AND TRADEMARK OFFICE
CERTIFICATE OF CORRECTION

PATENT NO. : 5 063 810
DATED : November 12, 1991
INVENTOR(S) : Isao Fujii

It is certified that error appears in the above-identified patent and that said Letters Patent is hereby corrected as shown below:

On the title page, the Assignee should read
---Suzuki Jidosha Kogyo Kabushiki Kaisha---.

Column 6, line 37; change "claim 5," to ---claim 3,---.

Signed and Sealed this

Sixth Day of April, 1993

Attest:

STEPHEN G. KUNIN

*Attesting Officer*     Acting Commissioner of Patents and Trademarks